United States Patent [19]
Keller

[11] Patent Number: 5,282,354
[45] Date of Patent: Feb. 1, 1994

[54] GAS TURBINE ARRANGEMENT

[75] Inventor: Jakob Keller, Dottikon, Switzerland

[73] Assignee: Asea Brown Boveri Ltd., Baden, Switzerland

[21] Appl. No.: 9,756

[22] Filed: Jan. 27, 1993

Related U.S. Application Data

[62] Division of Ser. No. 755,778, Sep. 6, 1991, Pat. No. 5,220,781.

[51] Int. Cl.$^5$ .............................................. F02C 03/03
[52] U.S. Cl. .................................. 60/39.02; 60/39.45
[58] Field of Search ....................... 60/39.45 A, 39.02; 417/64; 123/559.2

[56] References Cited

U.S. PATENT DOCUMENTS

| | | |
|---|---|---|
| 2,461,186 | 2/1949 | Seippel . |
| 2,738,123 | 3/1956 | Hassmann .................. 60/39.45 A |
| 3,398,525 | 8/1968 | Jenny ............................ 60/39.45 X |
| 4,679,393 | 7/1987 | Hellat et al. . |
| 4,719,746 | 1/1988 | Keller . |

FOREIGN PATENT DOCUMENTS

| | | |
|---|---|---|
| 0179233 | 3/1989 | European Pat. Off. . |
| 229280 | 10/1943 | Switzerland . |
| 987644 | 3/1965 | United Kingdom . |

OTHER PUBLICATIONS

International Search Report No. 90/071 EP, May 1991.

*Primary Examiner*—Richard E. Gluck
*Assistant Examiner*—Michael I. Kocharov
*Attorney, Agent, or Firm*—Burns, Doane, Swecker & Mathis

[57] ABSTRACT

This gas turbine arrangement has a gas turbine which can be divided into a high-pressure part and a basic part and has a compressor (1) and at least one energy exchanger (7). In addition, it has a combustion-chamber arrangement and a separate combustion chamber (18) connected upstream of the energy exchanger (7). The intention is to provide a gas turbine arrangement in which an increased efficiency is achieved by simple means and which can be regulated more simply. This is achieved by providing at least two combustion chambers (9, 10) for the combustion-chamber arrangement. The first (9) of the combustion chambers cooperates with the high-pressure part of the gas turbine arrangement. The second (10) of the combustion chambers cooperates, via the interposed energy exchanger (7) having the upstream combustion chamber (18), with the basic part.

3 Claims, 3 Drawing Sheets

GAS TURBINE ARRANGEMENT

This application is a divisional of application Ser. No. 07/755,778, filed Sep. 6, 1991, now U.S. Pat. No. 5,220,781.

BACKGROUND OF THE INVENTION

1. Field of the Invention

The present invention relates to a gas turbine arrangement that includes at least one gas turbine, a compressor and a pressure wave machine acting as an energy exchanger. More particularly, the present invention relates to a gas turbine arrangement including a combustion chamber arrangement for improved operating efficiency and control.

2. Discussion of Background

A gas turbine arrangement having a compressor for the combustion air, a gas turbine, and a pressure wave machine acting as an energy exchanger is disclosed, for example, in EP-0 179 233 B1. In this gas turbine arrangement, an energy exchanger which brings combustion air precompressed in a low-pressure compressor to an even higher pressure level is connected upstream of the gas turbine. A separate combustion chamber is connected upstream of the energy exchanger, the said combustion chamber being operated with gas or oil as the fuel and its combustion air being branched off from a high-pressure conduit for the supercharged air at the higher pressure level downstream of the energy exchanger. The high-pressure conduit carries the main part of the supercharged air into a combustion chamber in which gas or oil is burnt together with this air to form driving gas at high pressure and high temperature, which is passed into a high-pressure part of the gas turbine and drives this part. The somewhat cooled and somewhat expanded gases which have released part of their energy in supercharging the combustion air in the energy exchanger, are passed, after their emergence, into a basic part of the gas turbine, where they are mixed with the driving gas expanded in the high-pressure part and, together with this driving gas, further drive the gas turbine.

In this gas turbine arrangement, the energy exchanger is operated at a comparatively low operating temperature. At higher operating temperatures, an additional increase in the efficiency of the arrangement would be possible.

SUMMARY OF THE INVENTION

It is here that the invention is intended to provide a remedy. The invention as defined in the claims achieves the object of providing a gas turbine arrangement in which increased efficiency is achieved by simple means and which can be regulated more simply. The intention is, furthermore, to indicate a method for operating said arrangement.

The advantages achieved by means of the invention are essentially to be seen in the fact that, owing to two combustion chambers controllable independently of one another, particularly good efficiencies can be achieved even in part-load mode. It proves particularly advantageous that, despite the comparatively very high combustion temperatures, the formation of $NO_x$ is of little consequence since the gases only remain in the region of the high temperatures in the afterburner for an extremely short time, with the result that less $NO_x$ is produced here overall than in comparable arrangements. In addition, the use of the pressure exchanger avoids the possibility of hot gases from the afterburner heating up parts of the housing impermissibly.

The further embodiments of the invention form the subject-matter of the dependent claims.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
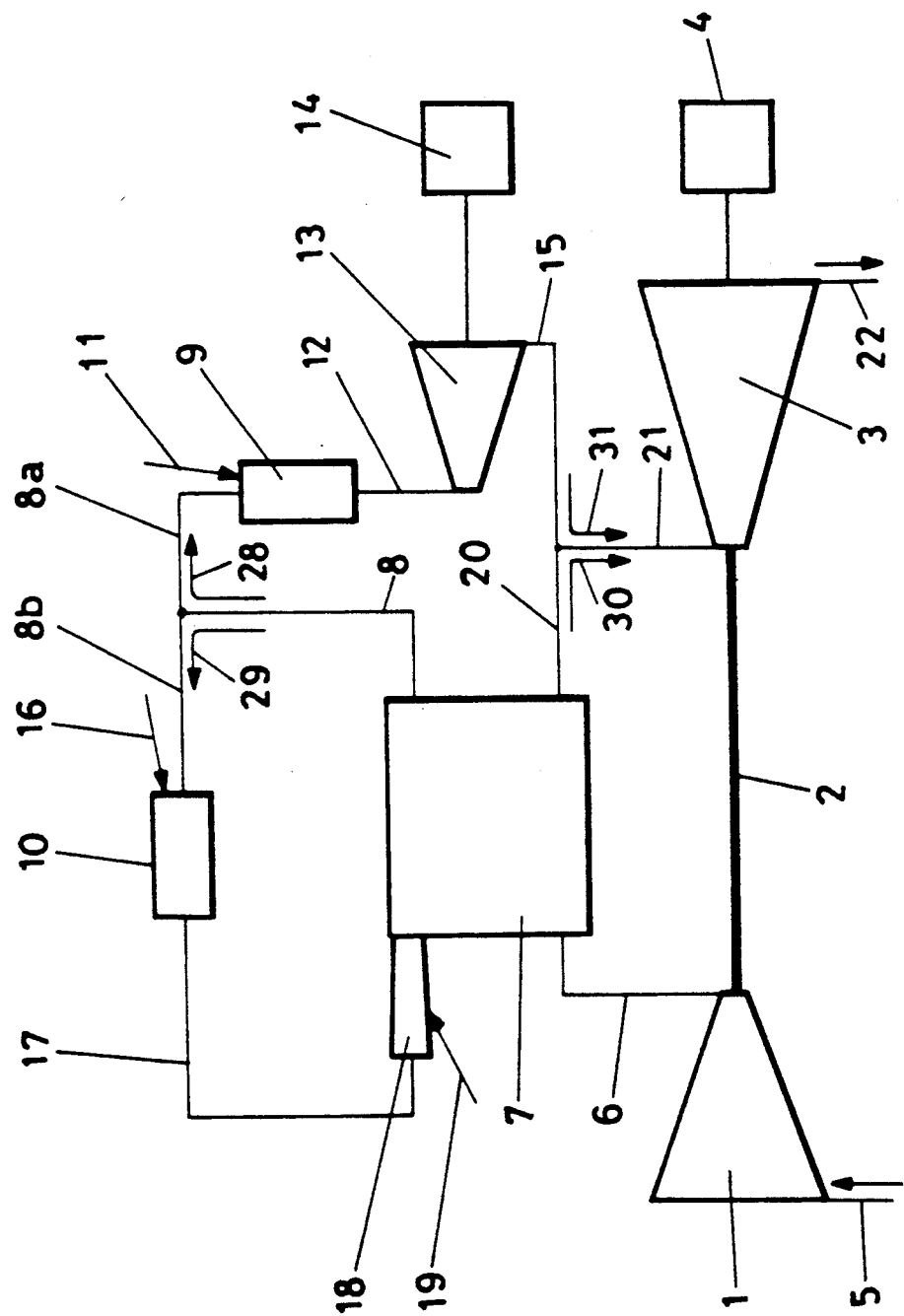
FIG. 1 shows a diagrammatic sketch of a first gas turbine arrangement.

Referring now to the drawings, wherein like reference numerals designate identical or corresponding parts throughout the several views, in FIG. 1 a diagrammatic sketch of a gas turbine arrangement according to the invention is depicted. This gas turbine arrangement has a compressor 1, which is driven via a shaft 2 by a basic turbine 3. In addition, the basic turbine 3 drives a generator 4 via a shaft. Via a line 5, air passes into the compressor 1, the compressed air passes out of the compressor 1 via a line 6 into an energy exchanger 7. From the energy exchanger 7, the now supercharged air passes out of the energy exchanger 7, via a line 8 which divides into a first leg 8a and a second leg 8b, into a combustion-chamber arrangement which has two combustion chambers 9, 10. The branch of the line 8 can be of controllable design, allowing the quantities of supercharged air which flow into the line 8a or the line 8b to be controlled as a function of the operating requirements placed on the gas turbine arrangement. As an arrow 11 indicates, fuel is fed to the first combustion chamber 9 and burnt together with the air from line 8a to form driving gas, which is introduced via a line 12 into a high-pressure turbine 13. Via a shaft, the high-pressure turbine 13 drives a generator 14. The partially expanded driving gas leaves the high-pressure turbine via a line 15.

The air which flows through line 8b is burnt in the second combustion chamber 10 together with fuel, the fuel feed being indicated by an arrow 16. The gases formed are passed via a line 17 into a separate third combustion chamber 18, which serves as an afterburner. As an arrow 19 indicates, fuel is fed to combustion chamber 16 too and burnt together with the gas from line 17. Combustion chamber 18 is arranged directly upstream of the energy exchanger 7, allowing the driving gases produced to pass directly into the energy exchanger 7. The driving gases leave the energy exchanger 7 via a line 20. Line 20 and line 15 combine to form a line 21 which carries the driving gases into the basic turbine 3. The expanded gases leave the basic turbine 3 via a line 22. The basic turbine 3 can be of single-stage or multiple-stage design. Line 22 can also lead into a heat exchanger, where further usable thermal energy is removed from the expanded gases.

Figure 2:
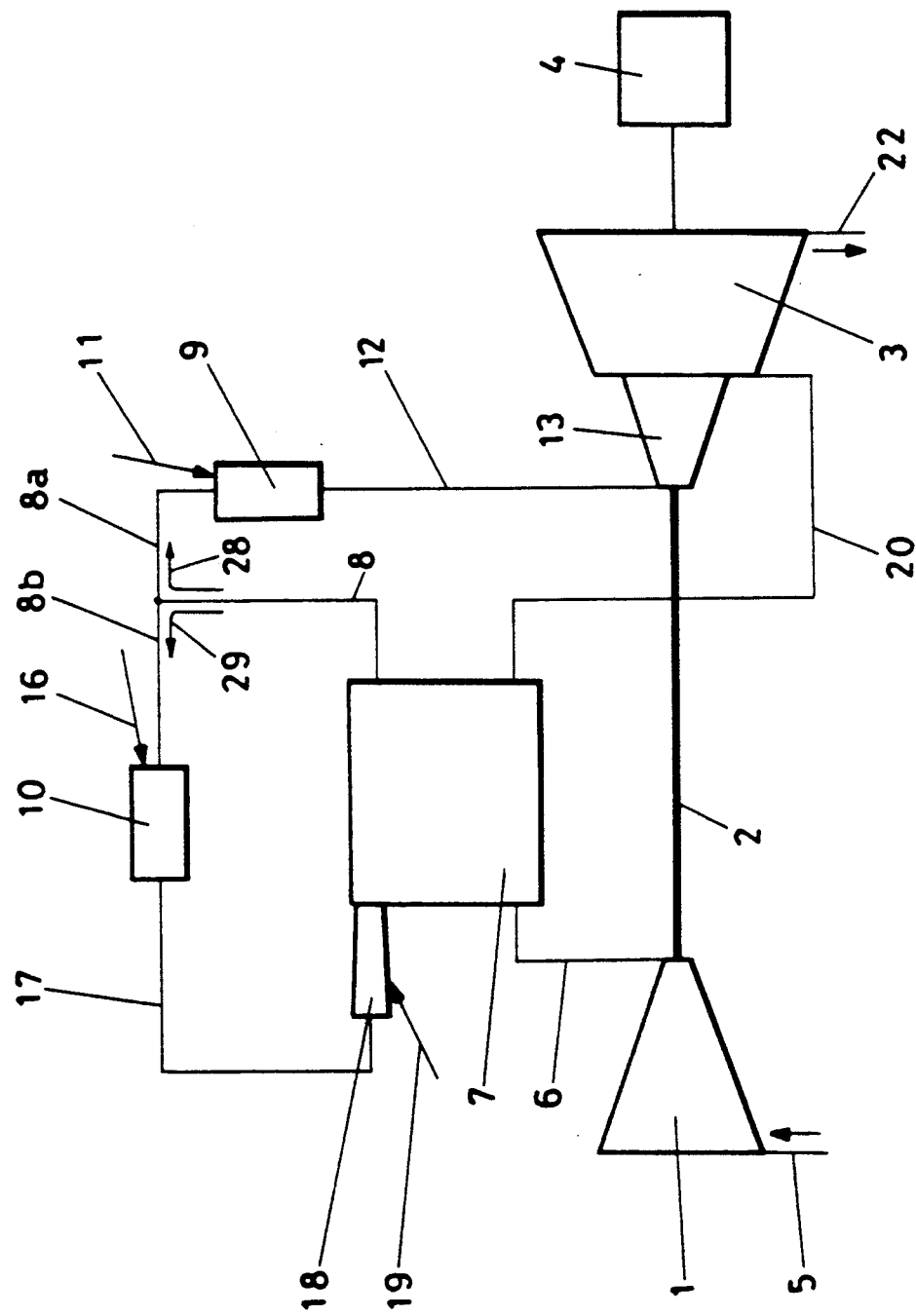
FIG. 2 shows a diagrammatic sketch of a second gas turbine arrangement.

FIG. 2 shows a further embodiment of a gas turbine arrangement. In this embodiment, the basic turbine 3 and the high-pressure turbine 13 are combined to form a subassembly, this embodiment otherwise coinciding with that in accordance with FIG. 1. This subassembly can be configured in such a way that the high-pressure turbine 13 and the basic turbine 3 are seated on a common shaft and jointly drive the compressor 1 and the generator 4, but it is also possible for the high-pressure turbine 13 to be coupled to the basic turbine 3 via a transmission (not shown).

Figure 3:
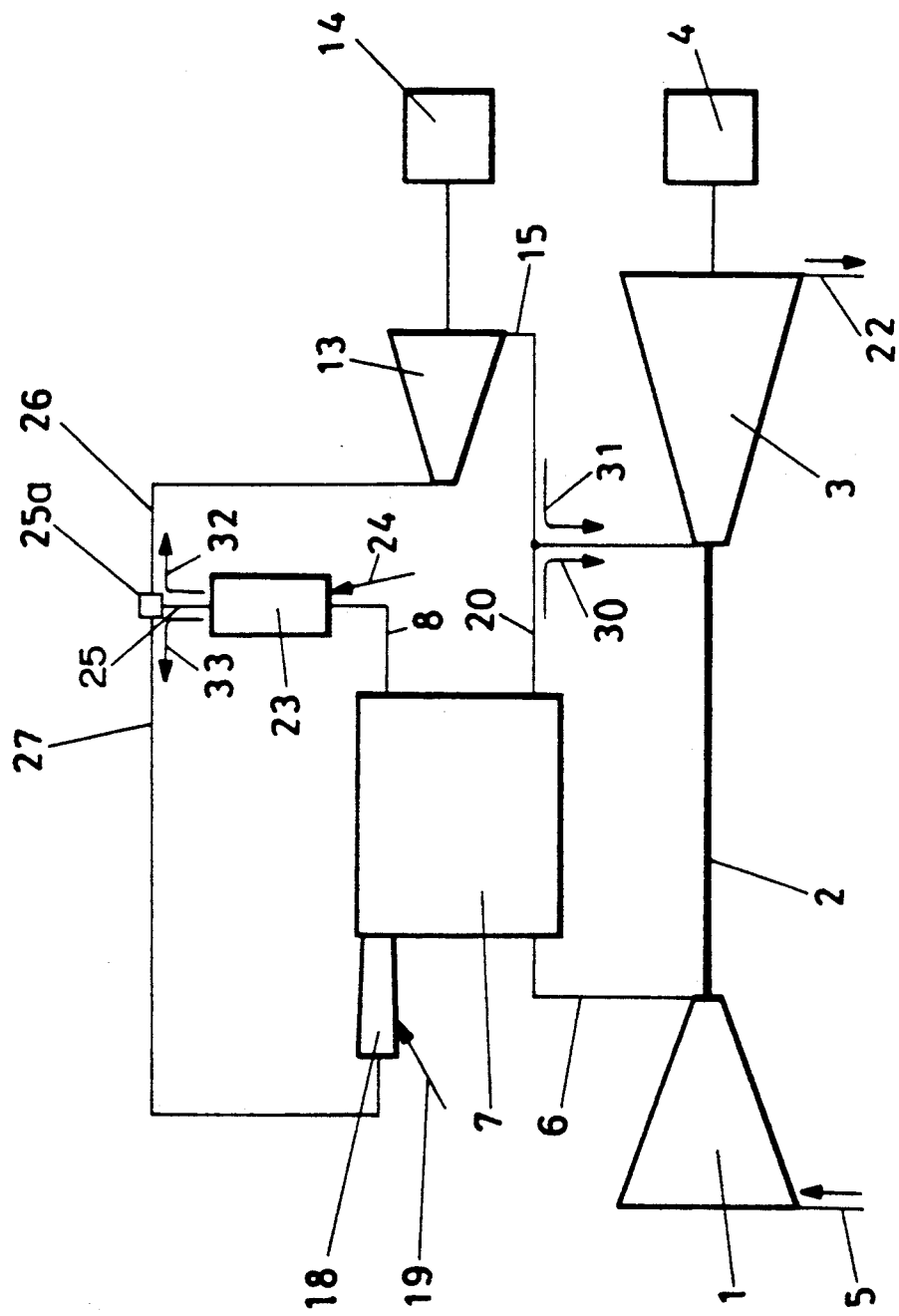
FIG. 3 shows a diagrammatic sketch of a third gas turbine arrangement.

FIG. 3 shows a gas turbine arrangement which is somewhat simplified compared to the embodiment according to FIG. 1. Here, only a single combustion chamber 23 is inserted in the combustion-chamber arrangement, fuel being fed to said combustion chamber as the arrow 24 indicates. The supercharged air fed in via line 8 is burnt in the combustion chamber 23 together with the fuel, to form driving gas. The driving gas is taken off via a line 25. Line 25 branches into a line 26, which leads into the high-pressure turbine 13, and into a line 27, which leads into the separate combustion chamber 18. The branch of line 25 includes means for controlling the flow of driving gas from line 25 to lines 26 and 27 allowing the quantities of driving gas flowing into line 26 or line 27 to be controlled as a function of the operating requirements placed on the gas turbine arrangement. The remaining structure of the arrangement corresponds to the structure according to FIG. 1.

The separate combustion chamber 18 can be provided with an injection facility for water or steam, thereby increasing the volume flow of the hot gases or gas/steam mixtures flowing into the energy exchanger 7. This measure leads to a further advantageous increase in the efficiency of the gas turbine arrangement.

For the purpose of explanation of the mode of operation, closer consideration will first of all be given to FIG. 1. In the compressor 1, air is compressed and from there flows via line 6 into the energy exchanger 7, where it is further compressed. The energy exchanger 7 is designed as a pressure wave machine and its mode of operation can be presumed to be known, it can be of single-stage or multiple-stage design. The energy exchanger 7 is preferably driven by inflowing and outflowing gases, but it is also possible to drive it from the basic turbine 3 or to provide it with a separate drive. The supercharged air at a higher pressure level leaves the energy exchanger 7 via line 8. Line 8 branches and a first part of the super-charged air flows into line 8a, as an arrow 28 indicates, a second part of the supercharged air flowing into line 8b, as indicated by an arrow 29. This branch can be designed in such a way that the proportion branched off is always the same, but it is also possible to make the branch of controllable configuration, allowing the quantity branched off to be altered, for example, as a function of the operating condition of the gas turbine arrangement as a whole. In general, as large a quantity as possible of the supercharged air produced is diverted into combustion chamber 10 via line 8b. In combustion chamber 10, this air is swirled together with fed-in fuel to give a superstoichiometric mixture and burnt to give driving gas. The driving gas, with a temperature in the range of about 1,000° C., is fed into combustion chamber 18 via line 17.

The driving gas still contains a sufficient proportion of air to act as combustion air in combustion chamber 18 for the fuel fed in there. Combustion chamber 18 accordingly acts as a kind of afterburner. The temperature and pressure of the driving gas are again increased in this afterburner. Such high temperatures, in the range above 1,350° C., are only possible because the rotating energy exchanger 7 is connected directly downstream of combustion chamber 18, in which energy exchanger, because of the energy exchange processes taking place there with comparatively cool air, the temperature established is only moderate and not the full temperature of the entering driving gas. In this way, it is possible advantageously to exploit the high energy content of the hot driving gas without these high temperatures posing a threat to the strength of the materials subjected to them. Because the high temperatures downstream of combustion chamber 18 only prevail for an extremely short time, no significant quantity of $NO_x$ can form despite these high temperatures.

It is furthermore possible for water or steam to be injected and mixed with the hot driving gas in the region of the combustion chamber 18. This leads to superheating of the water or steam and, associated with this, to an increase in the volume flow leaving the combustion chamber 18. The kinetic energy of this volume flow is used in the energy exchanger 7 to bring the air precompressed in the compressor 1 to the higher pressure level. After having expanded and cooled down somewhat in the energy exchanger 7, the very hot gas mixture forming the volume flow is carried away via line 20, as an arrow 30 indicates.

Via line 8a, supercharged air passes into combustion chamber 9, where, together with the fuel fed in there, it is burnt to form driving gas. This driving gas, which is under a comparatively high pressure and at a temperature of up to about 1,200° C., then drives the high-pressure turbine 13. In order to avoid overheating the latter, it is generally impossible to operate at temperatures higher than 1,200° C. It is therefore not possible to increase the efficiency of this arrangement by increasing the temperature. Via line 15, the somewhat expanded and somewhat cooled driving gas flows out of the high-pressure turbine 13, as an arrow 31 indicates. Because, at an average temperature of 1,200° C. upstream of the high-pressure turbine 13, the maximum gas temperatures will probably be about 1,400° C., the driving gas produced in combustion chamber 9 must not be hotter since otherwise too much $NO_x$ will be formed.

This driving gas and the hot gas mixture flowing out of the energy exchanger 7 via line 20 have approximately the same temperature and the same pressure and they are mixed with one another and passed into the basic turbine 3 via line 21. The utilization of the remaining energy of the driving gas and that of the gas mixture is here accomplished in the basic turbine 3 but it is also possible, depending on the operating concept of the gas turbine arrangement, to make the basic turbine 3 of multi-stage design. The driving gas leaves the basic turbine via line 22.

During a starting process, combustion chamber 10 is ignited first of all and then combustion chamber 18 in this gas turbine arrangement. Combustion chamber 18 is then activated until the quantity of driving gas produced is sufficient in order, after the energy exchanger 7, to operate the basic turbine 3 in idling mode. If the power of the gas turbine arrangement is now to be increased, combustion chamber 18 is first of all activated further, up to its power limit. In this lower part-load mode, the generator 4 already outputs electrical energy. If the power output of the gas turbine arrangement is to be further increased, the flow of compressed air into line 8a, as indicated by the arrow 28, is enabled and burner 9 is then ignited. The activation is further increased up to the predetermined set point value of the power output. Since the output power for the achievement of an optimum utilization of the gas turbine installation is generally in the upper part-load mode close to full-load mode or in full-load mode, it is sufficient to activate combustion chamber 9 only and thereby regulate the output power. In base-load mode, the gas turbine arrangement is preferably regulated solely via the activation of combustion chamber 9.

This method of operating the gas turbine arrangement has the advantage that the energy exchanger 7 is almost always operated under virtually constant operating conditions. The branch of the gas turbine arrangement which operates with the highest efficiency is thus not disturbed in its functioning and can operate optimally at all times. Even in the upper part-load mode, this leg can continue to be run in an absolutely homogeneous fashion since interventions for the purpose of compensating minor deviations from the set point value are effected in the other branch of the gas turbine arrangement, which does not operate with this high efficiency. In normal base-load mode and also in the upper part-load mode, this gas turbine arrangement therefore has a particularly high efficiency. The gas turbine arrangement according to FIG. 2 operates in the same way as the arrangement just described.

The mode of operation of the gas turbine arrangement according to FIG. 3 differs from the arrangement just described by the fact that a single combustion chamber 23 produces driving gas and that this driving gas, as arrows 32, 33 indicate, is then divided. Part of the driving gas, as arrow 32 indicates, flows directly into the high-pressure turbine 13 and a further part, as arrow 33 indicates, flows into combustion chamber 18. During starting, line 26 is here expediently closed at first in order to avoid energy losses. Only in the range of relatively high power, when the high-pressure turbine 13 is also brought in for energy production, is driving gas fed to it via line 26. The quantity of this driving gas is increased by increased infeed of fuel into combustion chamber 23. By means of this controllable infeed of fuel, it is possible to compensate deviations from the set point value of the power produced. The fluctuations in the quantity of driving gas produced will probably also have a slight effect on combustion chamber 18 but the economic advantages obtained due to the combustion chamber which is dispensed with in this arrangement here outweigh this effect. The rest of the starting operation and the base-load mode then proceed analogously to the manner described.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by letters patent of the United States is:

1. A method for starting and operating a gas turbine arrangement of the type including at least
   a high-pressure turbine,
   a basic gas turbine,
   an energy exchanger, the energy exchanger having at least a high-pressure port and driving gas inlet and exhaust lines,
   a branching line connected to the high-pressure export and dividing into a first leg connected to a high-pressure part of the gas turbine and a second leg connected to the driving gas inlet of the energy exchanger,
   means for controlling a flow from the branching line to the first and second legs,
   a combustion chamber interposed between the high-pressure port and the branching line, and
   a second combustion chamber connected directly upstream of the driving gas inlet of the energy exchanger, comprising the steps of:
   starting the gas turbine arrangement by:
      activating initially the first combustion chamber;
      closing the first leg and directing driving gas from the first combustion chamber into the second leg only;
      activating the second combustion chamber, and increasing the activity of the second combustion chamber until the quantity of driving gas produced downstream of the energy exchanger is sufficient to bring the basic turbine into an idling mode;
   increasing initially the power output of the arrangement by further activating the second combustion chamber to increase the output of the basic turbine;
   increasing further the power output of the arrangement by increasing the activity of the first combustion chamber and by opening the first leg and directing driving gas through the first leg to activate the high-pressure turbine; and
   regulating the output power of the gas turbine arrangement via activation of the first combustion chamber.

2. A gas turbine arrangement, comprising:
   a gas turbine having a high-pressure part and a basic part;
   a compressor driven by the turbine and having an output line;
   an energy exchanger having a low-pressure port and a high-pressure port, and a driving gas inlet line and exhaust line, the output line of the compressor being connected to the low-pressure port;
   a branching line connected to the high-pressure port and dividing into a first leg connected to the high-pressure part of the gas turbine and a second leg connected to the driving gas inlet of the energy exchanger;
   a combustion chamber interposed in the branching line upstream of the first and second legs; means for controlling the branching line for regulating the quantity of driving gas flowing from the combustion chamber into the first and second legs; and
   a second combustion chamber connected directly upstream of the driving gas inlet of the energy exchanger.

3. A gas turbine arrangement, comprising:
   a gas turbine having a high-pressure part and a basic part;
   a compressor driven by the turbine and having an output line;
   an energy exchanger having a low-pressure port and a high-pressure port, and a driving gas inlet line and exhaust line, the output line of the compressor being connected to the low-pressure port;
   a branching line connected to the high-pressure port and dividing into a first leg connected to the high-pressure part of the gas turbine and a second leg connected to the driving gas inlet of the energy exchanger;
   means for regulating a flow from the branching line to the first and second legs;
   a combustion chamber interposed in the branching line upstream of the first and second legs; and
   a second combustion chamber connected directly upstream of the driving gas inlet of the energy exchanger.

* * * * *